(12) United States Patent
Donta et al.

(10) Patent No.: US 8,794,186 B2
(45) Date of Patent: Aug. 5, 2014

(54) COVERED, ENCLOSED, COLLAPSIBLE, SHIPPABLE, DISPOSABLE ANIMAL LITTER BOX

(75) Inventors: Richard William Donta, Haden, AL (US); David Benjamin Traylor, Homewood, AL (US); Zachary Michael Bravos, Lisle, IL (US)

(73) Assignee: Kitty Kan, LLC, Homewood, AL (US)

( * ) Notice: Subject to any disclaimer, the term of this patent is extended or adjusted under 35 U.S.C. 154(b) by 460 days.

(21) Appl. No.: 13/087,200

(22) Filed: Apr. 14, 2011

(65) Prior Publication Data

US 2012/0234252 A1 Sep. 20, 2012

Related U.S. Application Data

(60) Provisional application No. 61/453,430, filed on Mar. 16, 2011.

(51) Int. Cl.
*A01K 29/00* (2006.01)
*A01K 1/01* (2006.01)

(52) U.S. Cl.
CPC .................................. *A01K 1/0125* (2013.01)
USPC ......................................................... 119/168

(58) Field of Classification Search
USPC ......................................... 119/168, 431, 499
See application file for complete search history.

(56) References Cited

U.S. PATENT DOCUMENTS

| | | | |
|---|---|---|---|
| 4,792,082 A | 12/1988 | Williamson | |
| 4,919,078 A * | 4/1990 | Morrison | 119/168 |
| 4,940,016 A * | 7/1990 | Heath | 119/168 |
| 4,986,217 A | 1/1991 | Robinson | |
| 5,203,282 A | 4/1993 | Hasiuk | |
| 5,383,422 A * | 1/1995 | Morris | 119/499 |
| 5,465,686 A * | 11/1995 | Monetti et al. | 119/168 |
| 5,572,951 A | 11/1996 | Evans et al. | |
| 5,765,504 A * | 6/1998 | Evans et al. | 119/168 |
| 6,487,990 B1 * | 12/2002 | McNew | 119/168 |

FOREIGN PATENT DOCUMENTS

FR 2618050 A1 7/1987

OTHER PUBLICATIONS

International Search Report (ISR) of PCT/US12/29255, dated Jul. 13, 2012, (2 pages).
Sketch of corrugated blank for folding into an enclosed cat litter box having a cut out for cat dated Aug. 20, 1989 (1 pg.).

(Continued)

*Primary Examiner* — Shadi Baniani
(74) *Attorney, Agent, or Firm* — Shlesinger, Arkwright & Garvey LLP (57) ABSTRACT

Enclosed, collapsible and shippable disposable animal litter box which can be shipped without loss of animal litter prefilled in the litter box, and which can be collapsed by the user for disposal after use, thus resealing the box so that used litter and animal waste are prevented from escaping the box. Litter box includes a top, bottom, left side, right side, front, and rear of sheet material with a litter tray for holding animal litter. Various sides are hingedly attached to each other for shipping, opening up by the user into an enclosed use position for the animal, and then for being closed into a disposal position after use. An animal entryway is provided. Entryway includes a removable seal for sealing entry for preventing litter from escaping when litter box is in collapsed position during both shipping of clean litter and discarding of used litter.

12 Claims, 6 Drawing Sheets

(56) References Cited

OTHER PUBLICATIONS

International Preliminary Report on Patentability (IPRP) in parent application No. PCT/US12/29255, dated Sep. 17, 2013 (4 pages).

www.poopycat.com, PoopyPets B.V. and PoopyPets Sales B.V., Amsterdam, The Netherlands (NL) copyright 2014, retrieved on Feb. 5, 2014 (6 pages).

* cited by examiner

FIG. 10 ically, the invention relates to a covered, enclosed, collapsible
COVERED, ENCLOSED, COLLAPSIBLE, SHIPPABLE, DISPOSABLE ANIMAL LITTER BOX

CROSS-REFERENCE TO RELATED APPLICATION

This application claims the priority of application Ser. No. 61/453,430, filed Mar. 16, 2011, and which is incorporated herein by reference.

FIELD OF THE INVENTION

The invention relates to an animal litter box. More particularly, the invention relates to a covered, enclosed, collapsible and shippable disposable animal litter box which may be erected by the user. Even more particularly, the invention relates to a covered, enclosed, collapsible and shippable disposable animal litter box which may be both shipped and disposed of without leakage of the animal litter, when shipped pre-filled with animal litter, and which may be disposed of with used animal litter without leakage and loss of the litter.

BACKGROUND OF THE INVENTION

Both covered and uncovered animal litter boxes are known, and have been provided for use by animals which naturally bury their waste, such as urine and feces, as well as for animals which may be trained to use such litter boxes.

Typical litter boxes are made of plastic, metal, or other material and are intended to be reused.

Disposable litter boxes likewise exist; however, known disposable litter boxes are unsatisfactory. Many known litter boxes are unsatisfactory because they cannot be shipped without leakage of litter material, as is the case with pre-filled litter boxes. Further, known litter boxes are unsatisfactory as they cannot be disposed of without leakage of the used litter or animal waste contained therein.

This is not only a problem for users, such as the consumers who buy and use pre-filled disposable litter boxes, but is particularly unsatisfactory and unusable by those who must avoid, or simply want to reduce exposure to, germs, parasites, and dust, or indeed animal waste when handling and disposing of the disposable litter boxes.

Accordingly, it can be seen that there is a need for a disposable, shippable, pre-filled litter box which avoids the above drawbacks and other drawbacks of the prior art.

OBJECTS AND SUMMARY OF THE INVENTION

It is an object of the invention to overcome the drawbacks of the prior art.

It is another object of the invention to provide a litter box which can be shipped pre-filled with animal litter, such as cat litter.

It is yet another object of the invention to provide a shippable pre-filled litter box which prevents the loss of animal litter or dust associated with the animal litter.

It is a further object of the invention to provide a shippable pre-filled litter box which is configured for preventing loss of the animal litter without the use of a plastic liner or container inside the litter box for preventing loss of such litter.

In sum, the invention is directed to an enclosed, collapsible and shippable disposable animal litter box which can be shipped without loss of animal litter pre-filled in the litter box, and which can be collapsed by the user for disposal after use, resealing the box so that used litter and animal waste is prevented from escaping the box.

The invention likewise includes, comprises, consists essentially of, or consists of a disposable, covered, enclosed, collapsible, shippable, animal litter box, which includes:
  a) a top, bottom, left side, right side, front, and rear of a disposable sheet material;
  b) the sheet material bottom including a litter tray configured for holding an animal litter;
  c) the left side hingedly attached at a left hinge to the bottom;
  d) the right side being hingedly attached to the bottom at a right hinge;
  e) the rear being hingedly attached to the bottom at a rear hinge;
  f) the top being hingedly attached to the left side at a top left hinge;
  g) a free end of the right side spaced apart from the right hinge being attached to a free end of the top at a distance from the top left hinge to make an attachment defining a top right hinge;
  h) an animal entryway provided in the front, the entryway defining an animal entry sufficiently large so that an animal can enter the enclosed litter box; and
  i) the entryway including a removable seal, the removable seal being attached to the entryway in the front and sealing the entry and substantially preventing the animal litter from going through the entry when the animal litter box is in its collapsed position.

The animal litter box further includes:
  a) the seal is attached to the entryway when the animal litter box is shipped.

The animal litter box further includes:
  a) the animal litter box is collapsible into a collapsed shipping position; and
  b) in the collapsed shipping position the front is folded down about a front hinge, then the rear is folded down on top of the front, and an attachment is provided between the front and the rear, and the attachment is provided between the seal and the rear, and the attachment is disposed so that when the rear is moved up away from the front the attachment causes the seal to be detached and removed from the entryway to open the animal entry so that the animal may enter the animal litter box.

The animal litter box further includes:
  a) the attachment includes an adhesive.

The animal litter box further includes:
  a) the disposable sheet material includes paper.

The animal litter box further includes:
  a) the disposable sheet material includes cardboard.

The animal litter box further includes:
  a) the seal is a circular piece of cardboard, and the front and rear are pieces of cardboard.

The animal litter box further includes:
  a) the seal is a circular piece of sheet material, and the front and rear are pieces of sheet material.

The animal litter box further includes:
  a) perforations are provided between the sheet material of the seal and the front.

Relative terms such as up, down, front, rear, left, and right are for convenience only and are not intended to be limiting.

DETAILED DESCRIPTION OF THE INVENTION

FIGS. 1-10 show an embodiment of a disposable litter box 10 according to the invention.

The invention likewise includes a disposable, covered, enclosed, collapsible, shippable, animal litter box 10, which includes a top 18, bottom 28, left side 32, right side 36, front 42, and rear 46 of a disposable sheet material 52; and the sheet material bottom including a litter tray 60 configured for holding an animal litter 64.

Figure 2:
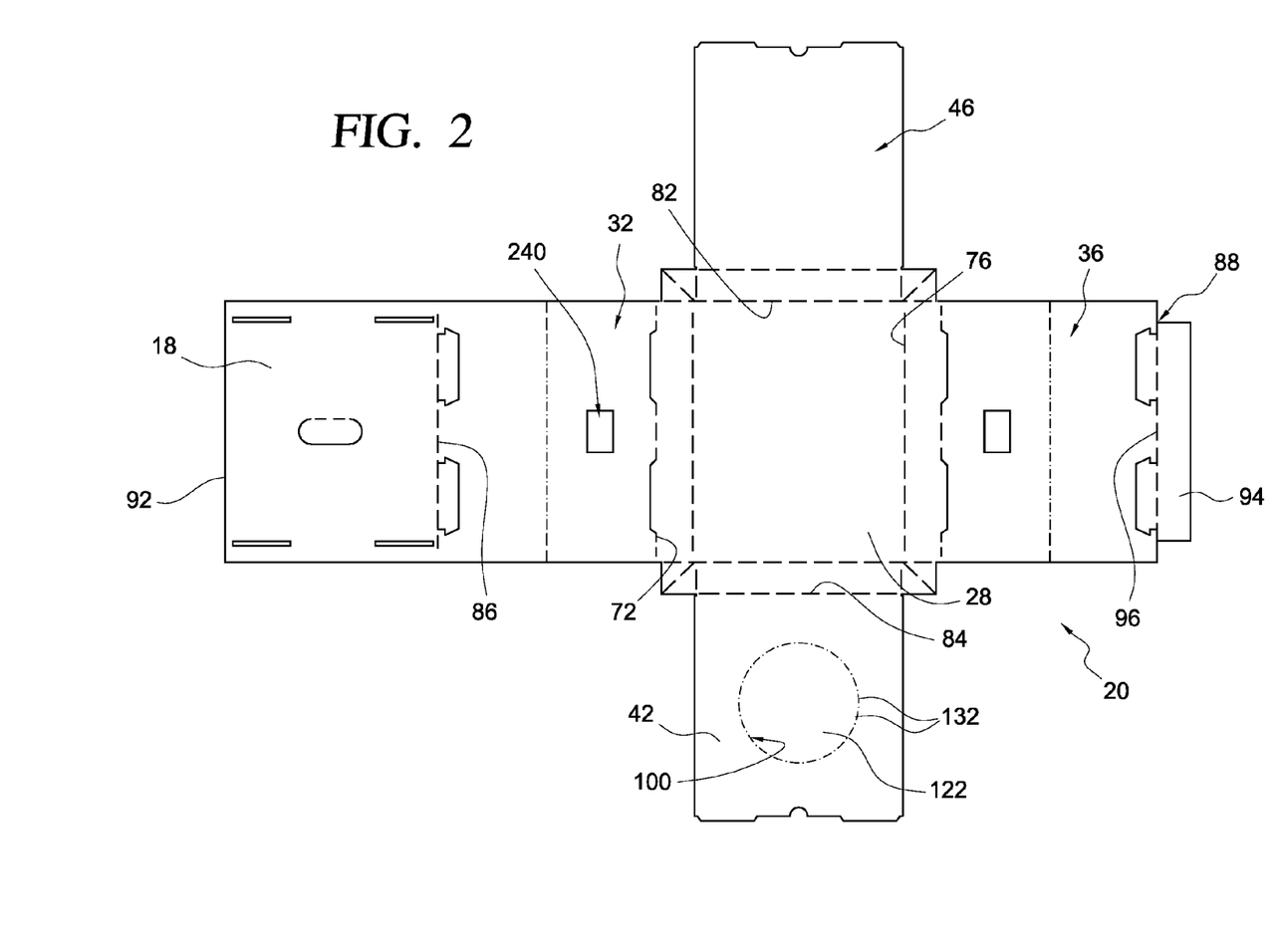
FIG. 2 is a top plan view of a blank for the disposable animal litter box of FIG. 1.

The left side 32 hingedly attached at a left hinge 72 to the bottom 28; the right side 36 being hingedly attached to the bottom 28 at a right hinge 76; the rear 46 being hingedly attached to the bottom 28 at a rear hinge 82; the top 18 being hingedly attached to the left side 32 at a top left hinge 86. A free end 88 of the right side 36 spaced apart from the right hinge 76 being attached to a free end 92 of the top 18 at a distance from the top left hinge 86 to make an attachment 92 attachable to an extension or glue tab 94 to define a top right hinge 96 when blank 20 is made into its initial form prior to be folded into its collapsed shipping position, as will be readily appreciated by a person having ordinary skill in the art. An entryway 100 provided in the front 42, the entryway defining an animal entry sufficiently large so that an animal can enter (in direction 108) the enclosed litter box 120. The entryway 100 includes a removable seal 122, the removable seal 122 being attached to the entryway 100 in the front 42 and sealing the entryway 100 and substantially preventing the animal litter from going through the entry when the animal litter box 10 is in its collapsed position.

The animal litter box further includes that the seal 122 may be attached to the entryway 100 when the animal litter box 10 is shipped.

Figure 1:
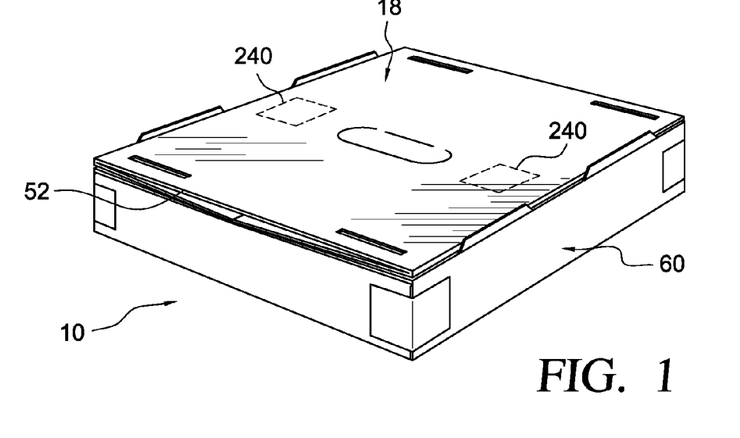
FIG. 1 is a front perspective view of an embodiment of a covered, enclosed, collapsible, shippable, disposable animal litter box according to the invention in its collapsed, sealed form for shipping.

The animal litter box 10 may be collapsible into a collapsed shipping position of FIG. 1; and in the collapsed shipping position the front 42 may be folded down about a front hinge 84, then the rear 42 may be folded down on top of the front 42, and an attachment 126 may be provided between the front 42 and the rear 46, and the attachment 126 may be provided between the seal 122 and the rear 46, the attachment 126 being disposed so that when the rear 46 is moved up away (in direction of arrow 102) from the front 42, then the attachment causes the seal 122 to be detached and removed from the entryway 100 to open the animal entry 104 so that the animal may enter the animal litter box when the litter box is in an enclosed, assembled, use position. For example, the animal may enter and exit, respectively, in the direction of double-headed arrow 108.

The animal litter box may include that the attachment 126 includes an adhesive.

The animal litter box 10 further may include that the disposable sheet material 52 includes cardboard. The seal 122 may be a circular piece of cardboard, and the front 42 and rear 46 are pieces of cardboard.

Seal 122 may likewise be a circular piece of sheet material, and the front and rear may also be pieces of sheet material. Perforations 132 may be provided between the sheet material of the seal 122 and the front 42.

Figure 3:
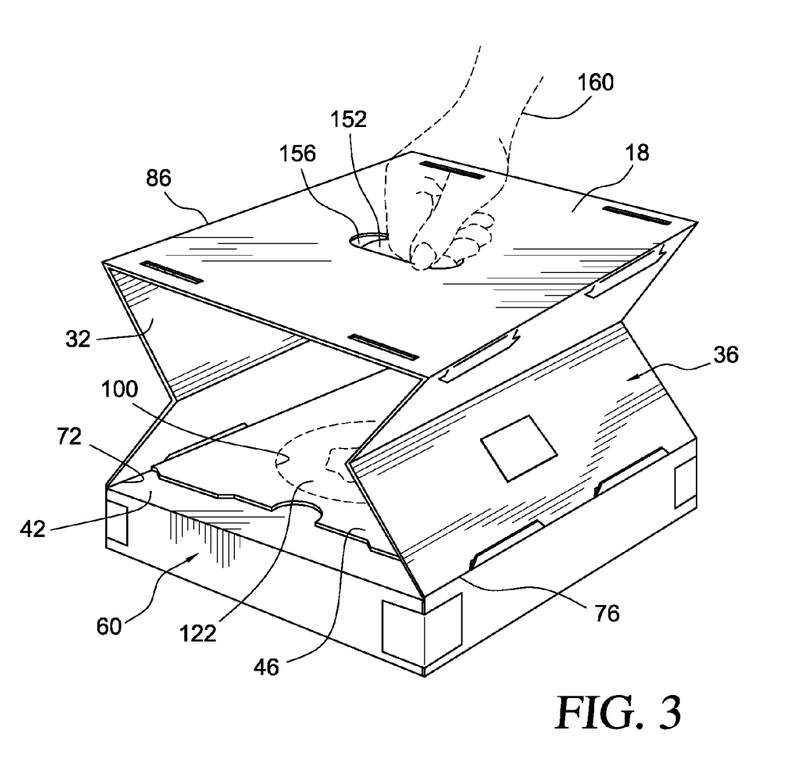
FIG. 3 is a front perspective view of the animal litter box of FIG. 1 as it is being moved into the use position from the collapsed shipping position of FIG. 1, showing the user pulling the top upwardly, and the left and right sides unfolding.

As to the collapsed form or position of litter box 10 of FIG. 1 in its configuration sealed for shipping, it is to be understood that sealed refers to the entryway 100 being sealed by the seal, such as the illustrated circular cardboard 122 so that litter 64 does not escape during shipping. That is to say, so that pieces of litter or dust from litter 64 do not work themselves out through the various parts of the box 10 during shipping. Further, it is to be noted that the closed shipping position of FIG. 1 may be accomplished by use of an unillustrated shrink-wrap, as is well known in the trade, for holding the closed litter box in its closed shipping position. Alternatively, instead of or in addition to the unillustrated shrinkwrap, one or more pieces of tape, or other known parts for keeping box 10 in its closed position may be used. In use, when the user is ready to open litter box 10 into its assembled or erected position, the user moves top 18 away from front 42, as shown in FIG. 3, and left side 32 and right side 36 begin to move about respective left hinge 72 and right hinge 76 as shown. As will be readily appreciated, there will be concurrent movement of left side 32 about top left hinge 86, for example. Each respective movement of different parts of left and right sides 32, 36, for example, will be readily understood, and will not be explained in detail for brevity, except when needed for understanding the embodiment of litter box 10 of the invention.

As seen in FIG. 3, the user may take his or her hand 160 and press downwardly against flap 152 in top 18 to define a hand hold. When flap 152 is pressed downwardly, as viewed in FIG. 3, it will be seen that an opening or vent 156 may be formed. This allows for the user to insert his or her hand. Flap 152 may remain in a downwardly extending position to leave vent 156 open as shown in FIG. 3, when box 10 is in use, should the user desire further ventilation of the assembled box 120, as shown in FIG. 5.

Figure 4:
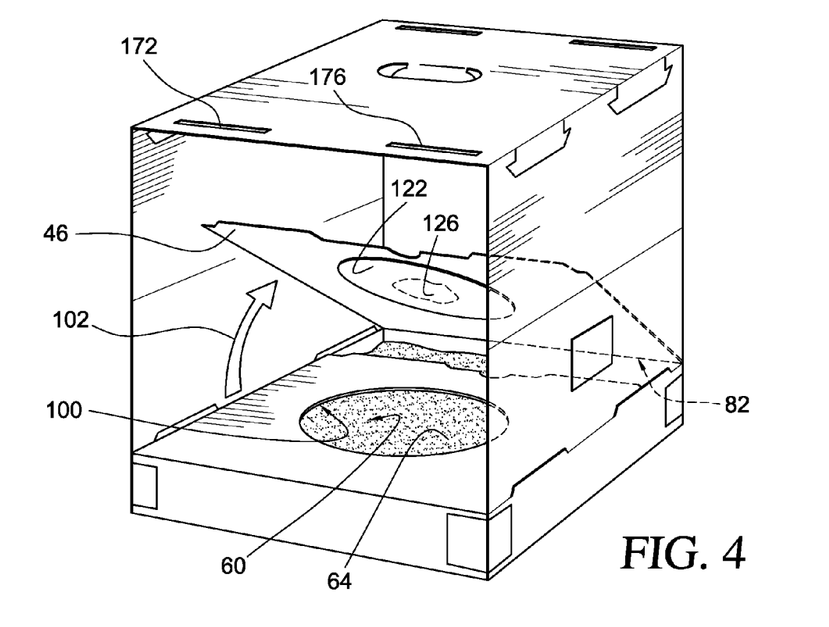
FIG. 4 shows the animal litter box as the left and right sides have been erected, the top is in place, and the rear is being moved up away from the front for removing the seal from the entryway in the front, shown here as a substantially circular animal entryway, and shown just after the attachment (shown here as an adhesive, such as glue, for example) between the circular seal and the rear has pulled out the seal from the entry so that the entry is open, as shown.
Figure 5:
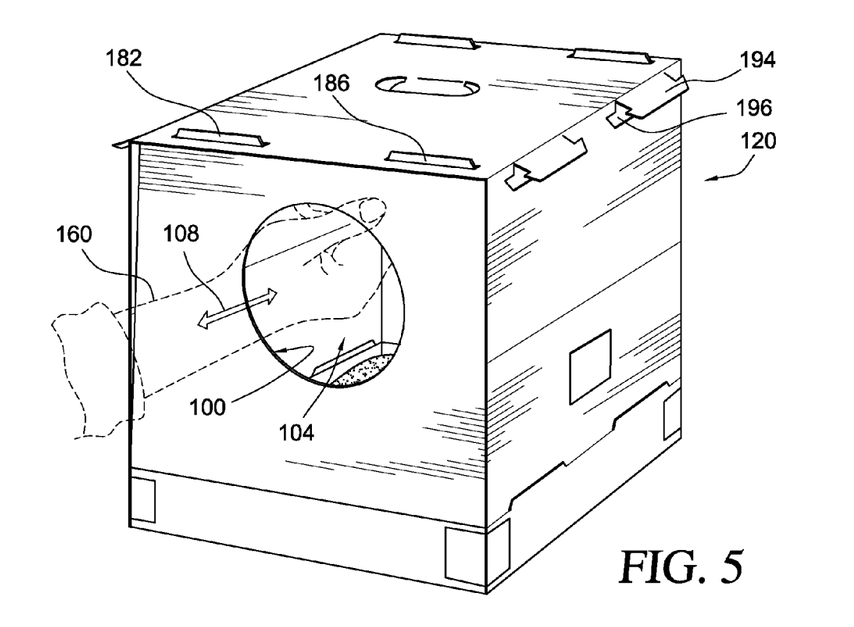
FIG. 5 shows the enclosed animal litter box in its fully erect position as the user is moving the front into its fully upright position with the animal entry positioned for use by the animal.

As shown in FIG. 4, as the user continues to erect box 10 into its assembled use position 120 of FIG. 5, the user will pull upwardly on rear 46 and move rear 46 in the direction of an arrow 102. As shown in FIG. 4, rear 46 has been moved sufficiently far away from front 42 so that rear 46 has pulled seal 122 off of (i.e. out of and away from) entryway 100. In that manner, entry 104 is provided (i.e., opened) through which the animal may enter and exit the fully erected, assembled box 120 of FIG. 5. The movement of rear 46 in direction 102 removes seal 122 thanks to the provision of an attachment, such as an adhesive 126, which may be glue, provided between seal 122 and rear 46. It will be appreciated that attachment 126 is sufficiently strong so that movement of rear 46 away from front wall 42 causes the force of the movement to pull seal 122 away from entryway 100. With reference to FIG. 2, it will be appreciated that, in the case of a paper or cardboard material forming the blank of FIG. 2, attachment 126 will be sufficiently strong so as to break the physical connection provided by perforations 132 between seal 122 and entryway 100 when rear 46 is moved sufficiently far away from front 42. It is also desirable that attachment 126 retain seal 122 in place during use, so that after litter box 10 has been used and collapsed for disposal, seal 122 will substantially completely seal off entry 100 and again retain litter 64; i.e. litter 64 after it has been used by the animal and is to be disposed of, as explained in detail below.

Further, it will be seen that FIG. 5 illustrates the assembled box 120, and hand 160 of the user is shown as it is grasping and moving front 42 into its fully assembled position. In this regard, it can be seen that respective slits 172, 176 in top 18 have received respective tabs 182, 186 therethrough. The cooperation between slits 172, 176, and respective tabs 182, 186 ensures that front 42 remains in place, even when an animal, such as a cat, enters and exits entry 104 in the direction of double-headed arrow 108, and rubs against entryway 100.

Further, as can be appreciated from FIG. 5, should the user wish to provide more ventilation than afforded by entry 104 and/or vent 156, the user may move one or more vent flaps 194 away from the remainder of right side 36, thus defining one or more vents 196, as shown.

As to FIG. 5, it will be further appreciated that, in use, the animal may enter and exit entry 104 in the direction of double-headed arrow 108, in an analogous manner to the user's hand 160 moving into entry 104 in order to complete the assembly of box 120 into its assembled position.

After assembled box 120 and litter 64 therein has been completely used, as determined by the user, such as the owner of the animal, or by the animal itself, as the user will readily appreciate based on the animal's behavior, then the assembled box 120 can be returned to a collapsed position for disposal of the used litter box and used litter 64.

Figure 6:
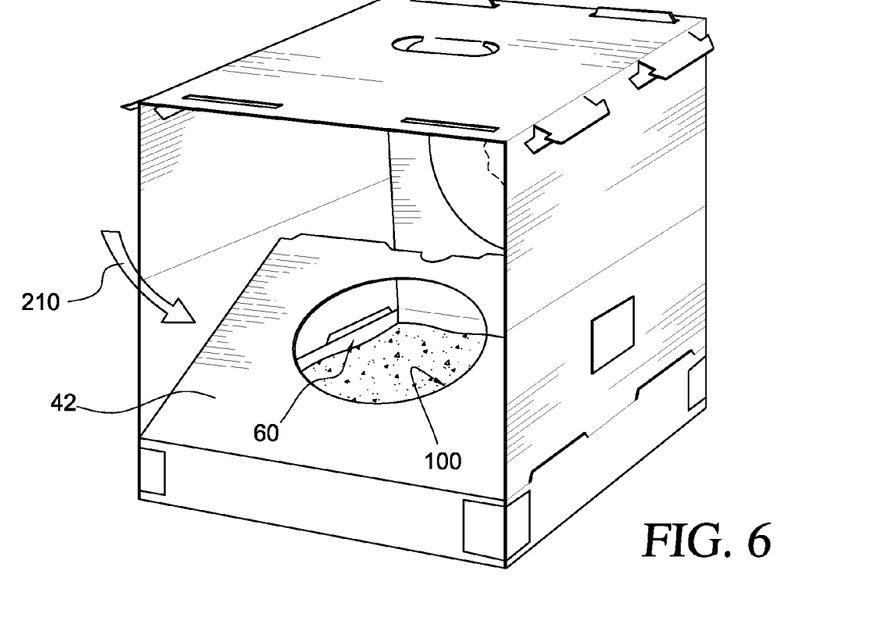
FIG. 6 shows the collapsible disposable litter box, after the animal litter has been used for collecting animal waste and as the front is being folded down about its hinge toward the used animal waste.

It will be appreciated that the user need not put his hand through entry 104 in order to close the box from its assembled to its collapsed position. Rather, the user may, for example, press against the outside of wall 42, such as at an upper portion thereof, and push against wall 42 in a direction toward rear 46 of the litter box, as viewed in FIG. 5. After the user has pushed against wall 42, wall 42 will move downwardly toward the tray 60, in a direction shown by arrow 210, as shown in FIG. 6, as will be readily appreciated.

Figure 7:
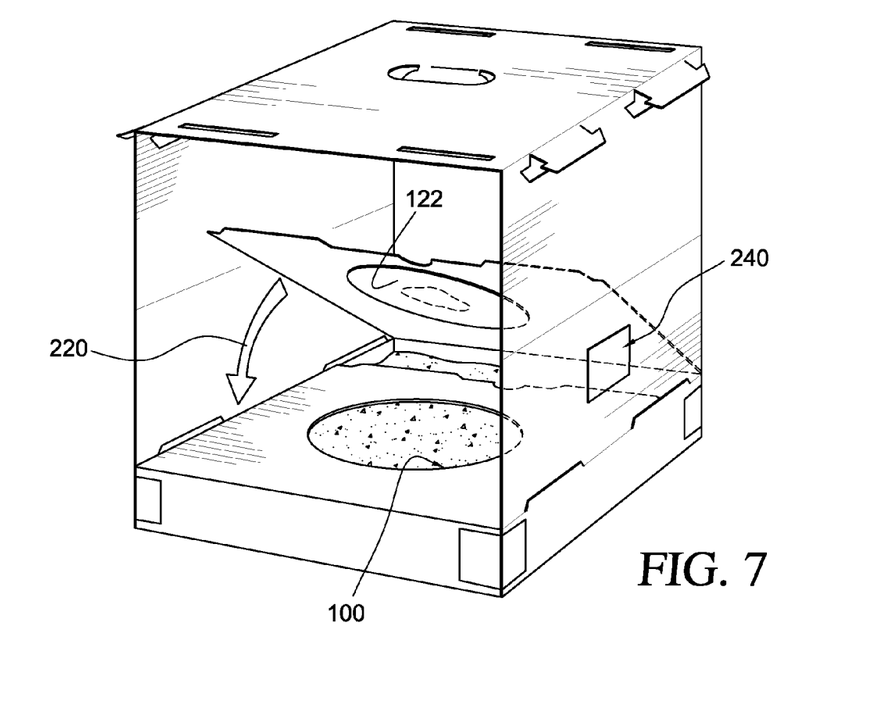
FIG. 7 is a front perspective view as the rear is being folded down toward the front and the seal for the entryway which has remained attached to the rear is being moved into position for sealing the entryway for preventing the used animal litter and animal waste from escaping during disposal of the litter box.

Then, again, without the user needing to place his or hand near or in contact with used litter 64, the rear 46 may be moved downwardly, such as shown by arrow 220 of FIG. 7, toward the somewhat horizontally extending front 42, as shown in FIG. 7. It will be noted that seal 122 shown in FIG. 7 is in the process of being returned to its sealing position in entryway 100 as rear 46 approaches its somewhat more substantially horizontal position as shown in FIG. 8, as will be readily appreciated.

Figure 8:
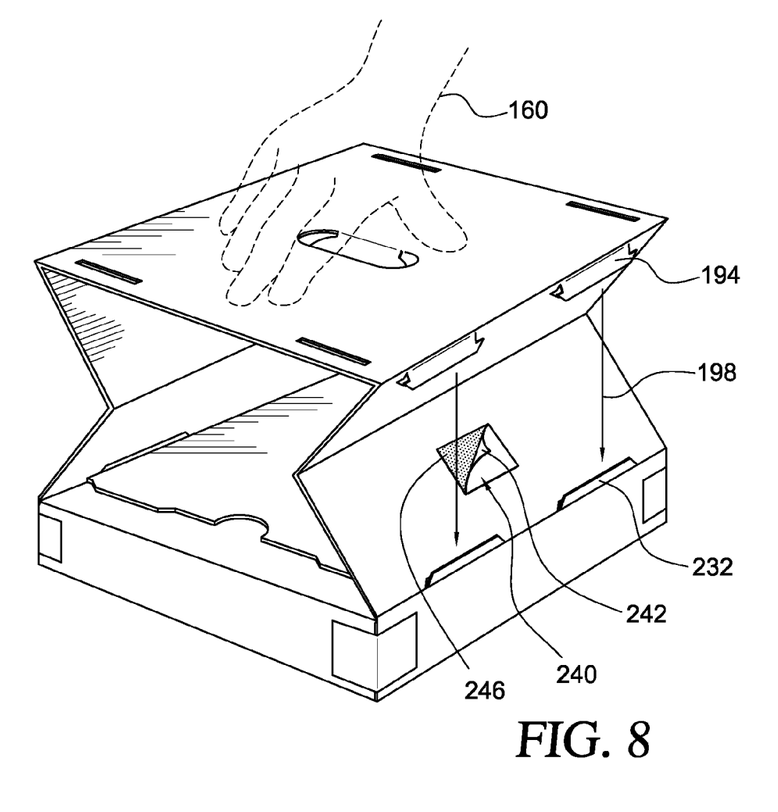
FIG. 8 shows the further position in which the left and right side walls are being collapsed down accordion style for moving the box into its final collapsed position for disposal of the box with the used litter therein, and the additional locking tabs shown adjacent the top are positioned for insertion into the mating female portions adjacent the bottom, and the adhesive is being exposed, such as the illustrated double-sided tape with the protective non-adhesive cover shown partially removed, so that both a mechanical locking and an adhesive locking of the collapsed box in its closed position is achieved.

As will likewise be appreciated from FIG. 8, the user may remove a protective layer, such as a non-adhering piece or sheet 242 of double-sided tape 240, in order to expose an adhesive material 246, before or as the user 160 presses downwardly on top 18, as represented by hand 160 on top of top 18 in FIG. 8. The attachment 240 may be in the form of a known double-sided tape, attached to blank 20 of FIG. 2, or, indeed, at any time prior to the collapsing of the used litter box into its collapsed, disposal position of FIG. 9, such as by peeling off one or both of the protective layers of the double-sided tape which prevent the adhesive 246 from being adhered to another object until the user is ready to completely collapse the box into its final collapsed position of FIG. 9.

Still further, in addition to or instead of attachment 240, such as the illustrated double-sided tape, vent flaps 194 may be configured as male tab elements and may be provided for insertion into and engagement with a female attaching element, such as provided behind and, indeed, to the left of a flap 232, such as shown in FIG. 8. In order for male element 194 to engage with the respective female element, as the male element 194 is moved downwardly in direction 198 by the user's hand 160, respective ones of male element 194 will move into place and engage with the corresponding female elements provided by flaps 232, as will be readily appreciated.

Figure 9:
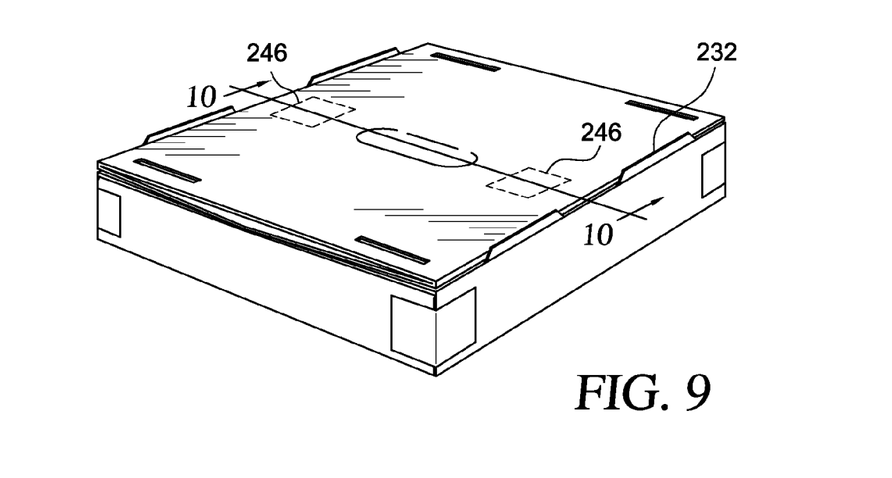
FIG. 9 shows the final, locked collapsed disposal position of the animal litter box in its final position ready for disposal.

FIG. 9 shows the collapsed disposal position in which flaps 232 extend upwardly, male tab elements 194 are engaged behind flaps 232, and adhesive 246 likewise holds the upper and lower halves of sides 32 and 36 together.

Figure 10:
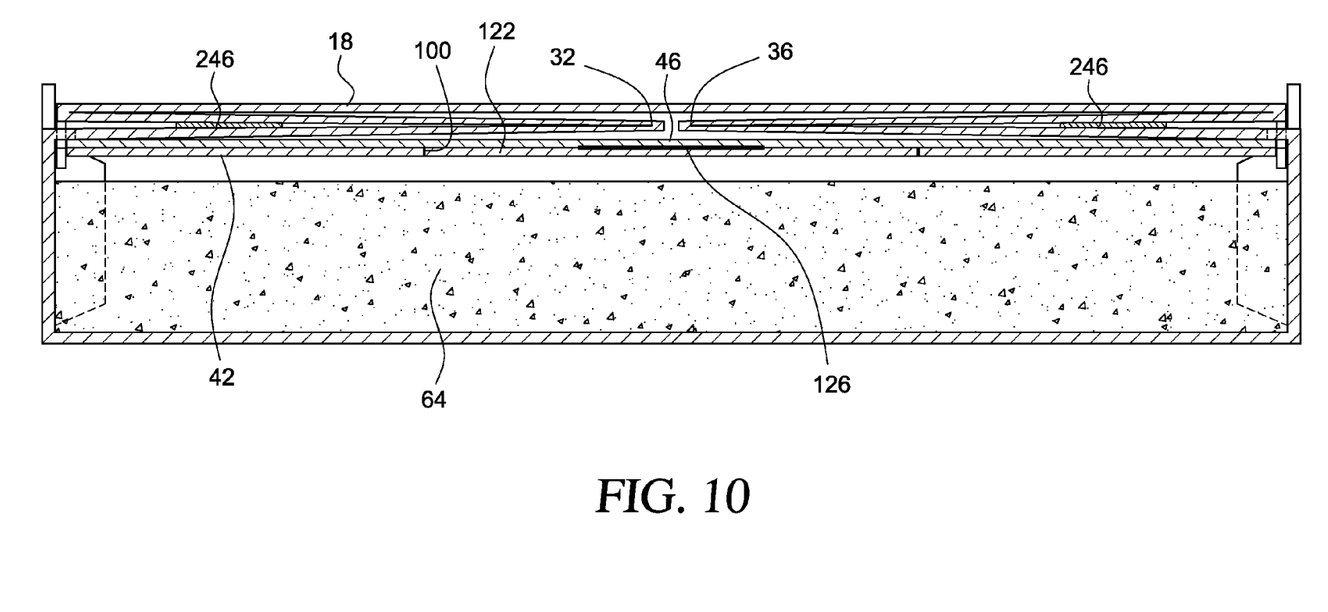
FIG. 10 is a sectional view of the animal litter box according to the invention taken along lines 10-10 of FIG. 9.

FIG. 10 shows a cross-sectional view taken in the direction of arrows 10-10 of FIG. 9, to illustrate how the used litter box in its collapsed, disposal position of FIG. 9, may be completely secured to ensure that no used litter escapes. The glue 126 between seal 122 and rear 46 is shown holding seal 122 in place within front 42. Further, adhesive 246 of two different pieces of double-sided tape 240, on respective left and right sides, is shown holding the respective folded down upper and lower parts of left side 32 and right side 36 together, in order to further assist in keeping box 10 in its closed disposal position of FIGS. 9 and 10.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A disposable, covered, enclosed, collapsible, shippable, animal litter box, comprising:
   a) a top, bottom, left side, right side, front, and rear of a disposable sheet material;
   b) the sheet material bottom including a litter tray configured for holding an animal litter;
   c) the left side hingedly attached at a left hinge to the bottom;
   d) the right side being hingedly attached to the bottom at a right hinge;
   e) the rear being hingedly attached to the bottom at a rear hinge;
   f) the top being hingedly attached to the left side at a top left hinge;

g) a free end of the right side spaced apart from the right hinge being attached to a free end of the top at a distance from the top left hinge and defining a top right hinge;

h) an animal entryway provided in the front, the entryway defining an animal entry sufficiently large so that an animal can enter the enclosed litter box;

i) the entryway including a removable seal, the removable seal being attached to the entryway in the front and sealing the entryway and substantially preventing the animal litter from going through the entry when the animal litter box is in a collapsed shipping position;

j) the seal being attached to the entryway when the animal litter box is in its collapsed shipping position;

k) the animal litter box being collapsible into its collapsed shipping position;

l) the animal litter box being collapsible into a collapsed closed position for disposal;

m) in the collapsed shipping position the front is folded down about a front hinge, the rear is folded down about the rear hinge on top of the front, an attachment is provided between the front and the rear, and the attachment is provided between the seal and the rear, the attachment is disposed so that when the rear is moved up away from the front the attachment remains attached to the seal and to the rear and causes the seal to be detached and removed from the entryway to open the animal entry so that the animal may enter the animal litter box when the litter box is in an assembled, use position; and n) in the collapsed closed position for disposal the front is folded down about the front hinge, the rear is folded down about the rear hinge on top of the front, and the seal attached to the rear by the attachment is returned to the entryway for sealing the entryway and substantially preventing the animal litter from going through the entry when the animal litter box is in its collapsed closed position for disposal.

2. The animal litter box as in claim 1, wherein:
a) the attachment includes an adhesive.

3. The animal litter box as in claim 2, wherein:
a) the disposable sheet material includes cardboard.

4. The animal litter box as in claim 2, wherein:
a) the seal is a circular piece of cardboard, and the front and rear are cardboard.

5. The animal litter box as in claim 1, wherein:
a) the disposable sheet material includes cardboard.

6. The animal litter box as in claim 1, wherein:
a) the seal is a circular piece of sheet material, and the front and rear are cardboard.

7. The animal litter box as in claim 6, wherein:
a) perforations are provided between the sheet material of the seal and the front.

8. The animal litter box as in claim 7, wherein:
a) a male and a female locking element are provided for physically locking the litter box in its closed position for disposal.

9. The animal litter box as in claim 8, wherein:
a) an adhesive attachment is provided for adhering one part of the right side to another part of the right side for physically locking the litter box in its closed position for disposal.

10. The animal litter box as in claim 1, wherein:
a) an adhesive attachment is provided for adhering one part of the right side to another part of the right side for physically locking the litter box in its closed position for disposal.

11. The animal litter box as in claim 1, wherein:
a) a male and a female locking element are provided for physically locking the litter box in its closed position for disposal.

12. The animal litter box as in claim 1, wherein:
a) the litter box is substantially enclosed when in its assembled, use position.

\* \* \* \* \*